United States Patent
Lee et al.

(10) Patent No.: US 9,971,314 B2
(45) Date of Patent: May 15, 2018

(54) WEARABLE WATCH AND DISPLAY METHOD THEREOF

(71) Applicants: Jun Ho Lee, Hwaseong-si (KR); Sangho Lim, Seoul (KR); Emhwan Kim, Yongin-si (KR); Jungsu Kim, Yongin-si (KR); Jang-Won Lee, Seongnam-si (KR); Jaehun Choe, Yongin-si (KR)

(72) Inventors: Jun Ho Lee, Hwaseong-si (KR); Sangho Lim, Seoul (KR); Emhwan Kim, Yongin-si (KR); Jungsu Kim, Yongin-si (KR); Jang-Won Lee, Seongnam-si (KR); Jaehun Choe, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 149 days.

(21) Appl. No.: 14/791,592

(22) Filed: Jul. 6, 2015

(65) Prior Publication Data

US 2016/0062321 A1    Mar. 3, 2016

(30) Foreign Application Priority Data

Aug. 27, 2014    (KR) .................. 10-2014-0112409

(51) Int. Cl.
| | |
|---|---|
| *G04G 21/00* | (2010.01) |
| *G04C 3/00* | (2006.01) |
| *G06F 1/16* | (2006.01) |
| *G06F 3/14* | (2006.01) |

(52) U.S. Cl.
CPC ............ *G04G 21/00* (2013.01); *G04C 3/002* (2013.01); *G06F 1/163* (2013.01); *G06F 1/1694* (2013.01); *G06F 3/14* (2013.01)

(58) Field of Classification Search
CPC ....... G04G 21/00; G06F 1/1694; G06F 1/163; G06F 3/14
See application file for complete search history.

(56) References Cited

U.S. PATENT DOCUMENTS

| | | | |
|---|---|---|---|
| 6,950,685 | B2 | 9/2005 | Barras et al. |
| 7,215,319 | B2 | 5/2007 | Kamijo et al. |
| 8,639,102 | B2 | 1/2014 | Seo et al. |
| D709,874 | S | 7/2014 | Aumiller et al. |
| 8,786,409 | B2 | 7/2014 | Zwart et al. |
| 2005/0276164 | A1* | 12/2005 | Amron ............... G04C 3/002 368/82 |
| 2008/0144446 | A1 | 6/2008 | Karterman |

(Continued)

FOREIGN PATENT DOCUMENTS

| | | |
|---|---|---|
| JP | 4249216 B2 | 1/2009 |
| JP | 5223514 B2 | 3/2013 |

(Continued)

*Primary Examiner* — Charles Hicks
(74) *Attorney, Agent, or Firm* — Volentine, Whitt & Francos, PLLC

(57) ABSTRACT

A method of operating a wearable watch includes recognizing a predetermined gesture including pitching or rolling, setting a yaw reference value when recognizing the predetermined gesture and compensating a display orientation according to a change in yaw data corresponding to yawing from the yaw reference value to uniformly keep a target shape according a gaze direction of a user.

20 Claims, 12 Drawing Sheets

(56) References Cited

U.S. PATENT DOCUMENTS

| | | | |
|---|---|---|---|
| 2011/0285622 A1* | 11/2011 | Marti | G06T 15/20 345/158 |
| 2012/0026166 A1* | 2/2012 | Takeda | A63F 13/06 345/419 |
| 2012/0176413 A1 | 7/2012 | Kulik et al. | |
| 2013/0107552 A1 | 5/2013 | Ahn et al. | |
| 2014/0045547 A1 | 2/2014 | Singamsetty et al. | |
| 2014/0085341 A1 | 3/2014 | Shin et al. | |
| 2015/0082180 A1* | 3/2015 | Ames | G06F 3/04815 715/738 |
| 2015/0124415 A1* | 5/2015 | Goyal | H05K 1/18 361/749 |

FOREIGN PATENT DOCUMENTS

| | | |
|---|---|---|
| KR | 10-2006-0070195 A | 6/2006 |
| KR | 10-1061363 B1 | 8/2011 |
| KR | 10-2013-0047214 A | 5/2013 |
| KR | 10-1398946 B1 | 5/2014 |

* cited by examiner

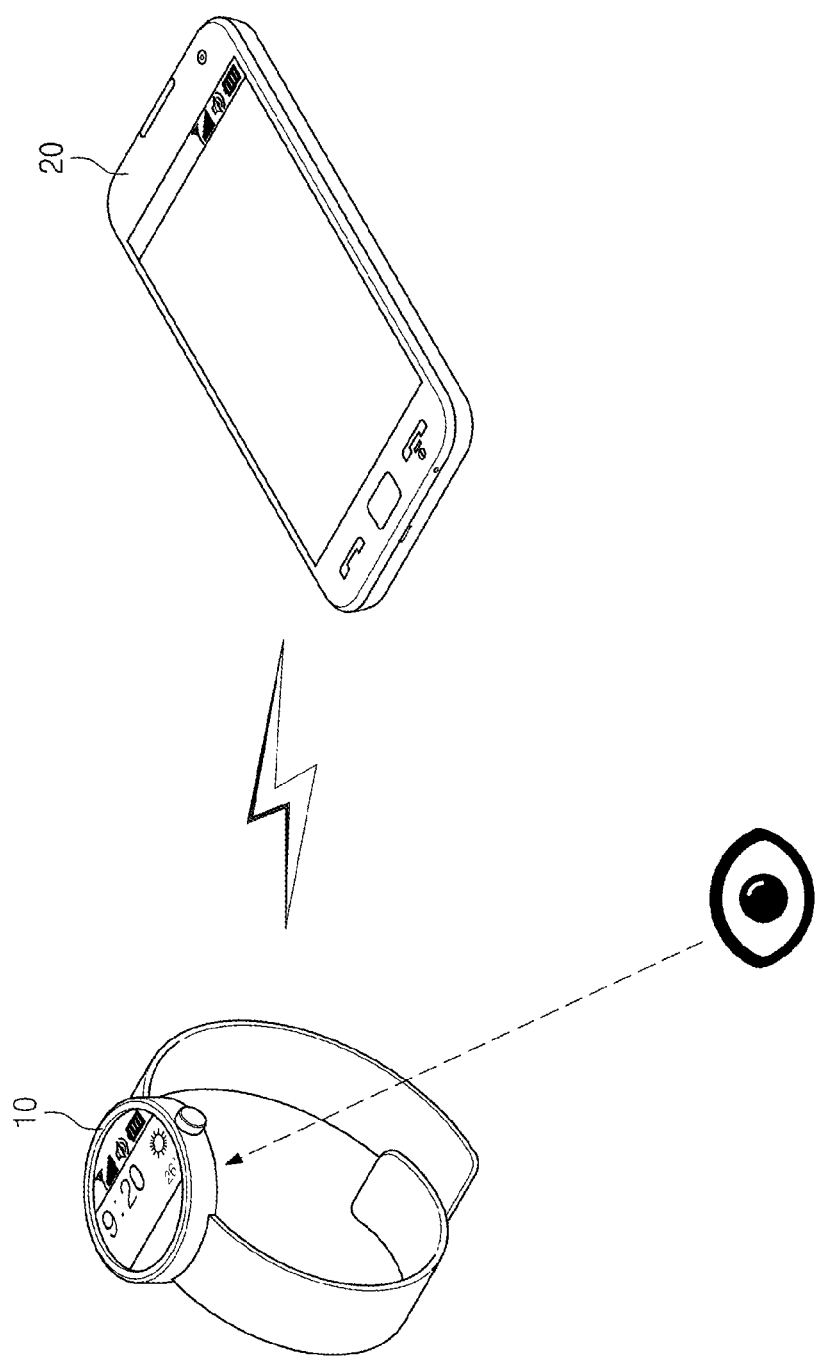

WEARABLE WATCH AND DISPLAY METHOD THEREOF

CROSS-REFERENCE TO RELATED APPLICATIONS

This U.S. non-provisional patent application claims priority under 35 U.S.C. §119 to Korean Patent Application No. 10-2014-0112409 filed Aug. 27, 2014, the subject matter of which is hereby incorporated by reference.

BACKGROUND

The inventive concept relates generally to wearable appliances, such as smart watches. More particularly, the inventive concept relates to methods of operating wearable watches having a display, such that a uniform target shape for an image displayed on the display is maintained according a gaze direction determined between a user and the display.

With development of an information communication technique and a semiconductor technique, a portable electronic device is developing as a multimedia device that provides various multimedia services using a data communication service as well as a voice communication service. For example, a portable electronic device may provide various multimedia services such as a broadcast service, a wireless internet service, a camera service, and a music play service.

Nowadays, a wearable watch where a communication and a computing function is combined in a watch may simply identify a telephone caller display, a short message service (SMS), a schedule, a social network service (SNS), and an e-mail through a linkage of a smart-phone. Since the wearable watch may process a function of a music player, sending message, and calling, a consumer pays attention to the wearable watch.

SUMMARY

One aspect of embodiments of the inventive concept is directed to provide a wearable watch and a display method thereof.

The technical objectives of the inventive concept are not limited to the above disclosure; other objectives may become apparent to those of ordinary skill in the art based on the following descriptions.

In accordance with one aspect of the inventive concept, a method for displaying in a wearable watch includes recognizing a predetermined gesture including pitching or rolling, setting a yaw reference value upon recognizing of the predetermined gesture and compensating a display orientation according to a change in yaw data corresponding to yawing from the yaw reference value to uniformly keep a target shape according a gaze direction of a user.

In one embodiment, the wearable watch includes a circular display panel.

In another embodiment, the wearable watch includes a rectangular display panel.

In still another embodiment, the method further includes determining whether the display orientation is compensated.

In yet another embodiment, the determining includes determining that the display orientation is compensated when the target shape displayed on a display panel is circle.

In yet another embodiment, the determining includes determining that the display orientation is compensated when a gaze direction between the wearable watch and the user gets out of a specific range.

In yet another embodiment, the determining further includes recognizing a gaze direction between the wearable watch and the user.

In yet another embodiment, the method further includes setting a pitch reference value or a roll reference value upon recognizing of the predetermined gesture.

In yet another embodiment, the compensating includes compensating the display orientation according to pitch data corresponding to pitching from the pitch reference value or roll data corresponding to rolling from the roll reference value In yet another embodiment, the recognizing includes inputting pitch data and roll data from a gyroscope sensor and recognizing the predetermined gesture using the pitch data and the roll data.

In yet another embodiment, the predetermined gesture is a roll gesture corresponding to the rolling.

In yet another embodiment, the compensating includes compensating the display orientation so that the target shape displayed on a display panel uniformly appears to the user regardless of the yawing.

In accordance with another aspect of the inventive concept, a method of displaying a wearable watch having a circular display panel, the method includes pushing a specific button, setting a yaw reference value when a push of the specific button is sensed, and compensating a display orientation according to a change in yaw data corresponding to yawing from the yaw reference value to uniformly keep a target shape according a gaze direction of a user.

In one embodiment, the specific button is a hardware button.

In another embodiment, the specific button is displayed on the circular display panel.

In still another embodiment, the method further includes recognizing a gaze direction between the wearable watch and the user.

In yet another embodiment, the recognizing includes recognizing a slope of the user's pupil, and the display orientation is compensated according to the slope of the pupil.

In accordance with still another aspect of the inventive concept, a method of displaying a wearable watch having a circular display panel includes recognizing a gaze direction between the wearable watch and a user and compensating a display orientation according to a change in pitch data, roll data, or yaw data to uniformly keep a target shape according a gaze direction of the user when the gaze direction gets out of a predetermined range.

In one embodiment, the compensating includes compensating the display orientation so that the gaze direction does not get out of the predetermined range when the wearable watch moves.

In another embodiment, the compensating includes compensating the display orientation so that the gaze direction does not get out of the predetermined range when the wearable watch is located in a position fixed from the user and the user moves.

In accordance with yet another aspect of the inventive concept, a wearable watch to perform a wireless communication includes a circular display panel, a watch body including at least one position sensor to sense a motion of the wearable watch or a motion of a user and a watch band connected to the watch body to wear the wearable watch on the user's wrist, and a display orientation displayed on the circular display panel is compensated according to motion data outputted from the at least one position sensor to uniformly keep a target shape according a gaze direction of the user.

In one embodiment, the watch body includes a battery.

In another embodiment, the battery is charged according to a cable charging method or a wireless charging method.

In still another embodiment, the watch band includes a battery.

In yet another embodiment, the at least one position sensor includes a gyroscope sensor.

In yet another embodiment, a predetermined gesture is sensed according to pitch data or roll data outputted from the gyroscope sensor and the display orientation is compensated according to an amount of change of yaw data in accordance with the predetermined gesture.

In yet another embodiment, the display orientation is compensated according to an amount of change of yaw data outputted from the gyroscope sensor to uniformly keep the target shape displayed on the circular display panel when the user looks at the circular display panel regardless of yawing of the wearable watch.

In yet another embodiment, the at least one position sensor includes a compass sensor.

In yet another embodiment, the wearable watch further includes a camera sensor configured to sense a gaze direction between the wearable watch and the user.

The wearable watch and a display method thereof according to an embodiment of the inventive concept may provide an optimal display environment to a user by compensating a display orientation according motion data.

BRIEF DESCRIPTION OF THE DRAWINGS

The above and other objects and features will become apparent from the following description with reference to the following figures, wherein like reference numerals refer to like parts throughout the various figures unless otherwise specified, and wherein

FIG. 15 is a diagram illustrating a determination of a display orientation according to another embodiment of the inventive concept;

DETAILED DESCRIPTION

Figure 1:
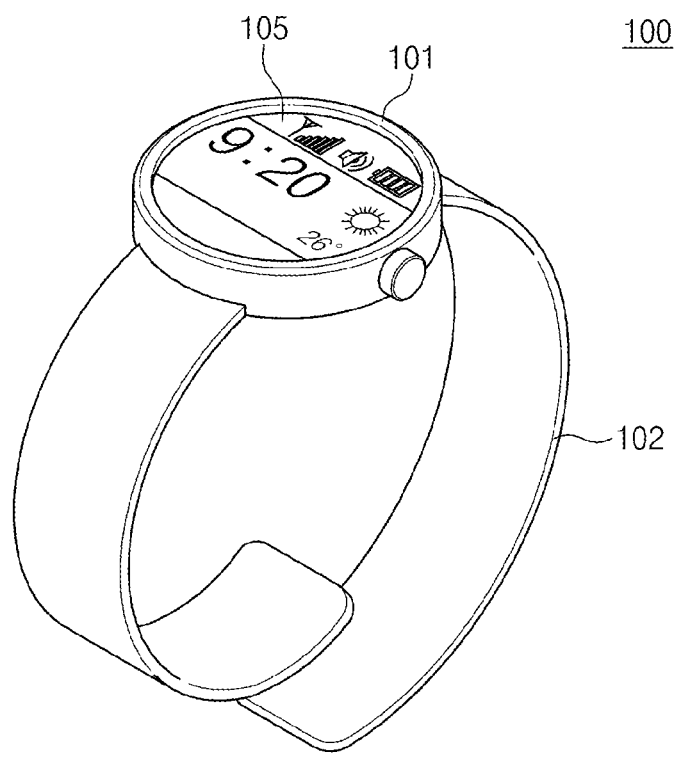
FIG. 1 is a diagram exemplarily illustrating a wearable watch according to an embodiment of the inventive concept.

Certain embodiments of the inventive concept will now be described in some additional detail with reference to the accompanying drawings. The inventive concept, however, may be embodied in many different forms and should not be construed as being limited to only the illustrated embodiments. Rather, these embodiments are provided as examples so that this disclosure will be thorough and complete, and will fully convey the concept of the inventive concept to those skilled in the art. Unless otherwise noted, like reference numerals denote like or similar elements throughout the attached drawings and written description.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a perspective diagram illustrating a wearable watch 100 (e.g., a wrist watch) according to an embodiment of the inventive concept. Referring to FIG. 1, the wearable watch 100 generally comprises a watch body 101 attached to a watch band 102.

The watch body 100 houses in addition to other circuitry, various software and/or hardware components (hereafter, collectively or singularly, "software/hardware components") configured to wirelessly communicate (i.e., receive and/or transmit) data. Thus, the watch body 101 includes software/hardware components capable of conducting wireless communication according to one or more conventionally understood wireless communication protocols, such as wireless wide area network (WWAN), wireless metropolitan area network (WMAN)—e.g., IEEE 802.16 or WiMAX, wireless local area network (WLAN)—e.g., NFC, BLE, WiFi, or Ad-Hoc, wireless personal area network (WPAN)—e.g., IEEE 802.15, Zigbee, Bluetooth, UWB, RFID, Wireless USB, Z-Wave, and Body Area Network, etc.

As shown in FIG. 1, the visual field provided by an upper surface of the watch body 101 may be filled, wholly or in part, by a display 105. The watch body may have a circular or round shape, such that illustrated in FIG. 1, or any other reasonable shape and size. The display 105 may have any reasonable shape as presented on the upper surface of the watch body 101 (e.g., a rectangular or circular display panel).

The watch body 101 and/or watch band 2 may be used to house one or more rechargeable batteries (not shown) (hereafter, singularly or collectively the "battery") capable of powering the wearable watch 100. The battery may be recharged by connection of charging circuitry in the wearable watch 100 with an external charge source (e.g., an AC outlet). Alternately or additionally, the battery may be charged wirelessly (i.e., with a hardwire charging connection). Here, wireless charging may be performed using one or more of magnetic induction, magnetic resonance, electromagnetic induction, and a non-radiation type of wireless electricity (WiTricity).

The watch body 101 may also house one or more sensors such as those used to implement image or video recording/display, audio signal reception/generation, proximity sensing, illumination generation, electromagnetic (or "light") signal reception, GPS location, velocity, altitude and/or acceleration sensing, magnetic field sensing, gyroscope sensing, etc. In certain embodiments of the inventive concept, the watch body 101 will include one or more sensor(s) hereafter referred to singularly or in combination as a "motion sensor", where the term motion sensor is capable of sensing motion or movement (e.g., absolute motion, relative motion, and/or motion in one or more directions) of the wearable watch 100 as worn by a user. In certain examples, the motion sensor may include one or more GPS sensor(s), light sensor(s), proximity sensor(s), magnetic field sensor(s), acceleration sensor(s), and/or gyroscope sensor(s). However specifically configured, a motion sensor consistent with embodiments of the inventive concept will be capable of generating, storing and/or communicating "motion data" indicative of the motion of the wearable watch 100 as sensed by the motion sensor.

In the foregoing context, a magnetic field sensor (e.g., a compass sensor) may identify motion in an absolute direction relative to the earth's magnetic field. A magnetic field sensor may also be configured to identify one or more motion direction(s) for the wearable watch 100 relative to an absolute direction, and as such may serve as a multi-axis sensor.

An acceleration sensor may be used to determine change in motion velocity (e.g., calculate moving distance in units of time), where a change in velocity may indicate a change in motion distance. A gravitational acceleration sensor detects or measures motion in relation to gravitational acceleration (i.e., a uniform 9.8 m/s$^2$ in a direction towards the earth's center of mass), and may be used to sense an inclined state for the wearable watch 100. That is, because an output value provided by an acceleration sensor varies with an inclined state of the wearable watch 100, the inclined state of the wearable watch 100 may be accurately measured.

A gyroscope sensor may be used to sense angular velocity of the wearable watch 100 in terms of a measured repulsive power of rotation that is generated when the wearable watch including the gyroscope sensor rotates. In certain embodiments of the inventive concept, a gyroscope sensor may be implemented as a Micro-Electro-Mechanical System (MEMS) sensor, such as the type that uses a tuning fork method with respect to Coriolis power. Here, the tuning fork method measures a rotatory power applied from every direction using two pendulums that infinitely vibrate.

These are but several possible implementation approaches that may be taken with respect to various embodiments of the inventive concept. The configuration and/or operation of the wearable watch 100 generally illustrated in FIG. 1 may include one or more features described by published U.S. Patent Applications 2014/0139422, 2014/0143785, 2014/0143678, 2014/0143737, and 2014/0139486, the subject matter of which is here incorporated by reference.

However configured, embodiments of the inventive concept, like the wearable watch 100 shown in FIG. 1, may be used to determine, adjust, control or vary (i.e., change or update), the orientation of the display 105 on the watch body 101 (hereafter, "display orientation") for best viewing by the user of the wearable attach in response to motion data provided by the motion sensor. That is, a wearable watch consistent with embodiments of the inventive concept will always provide, unless instructed otherwise, an optimal display orientation, regardless of user environment or activity.

Figure 2:
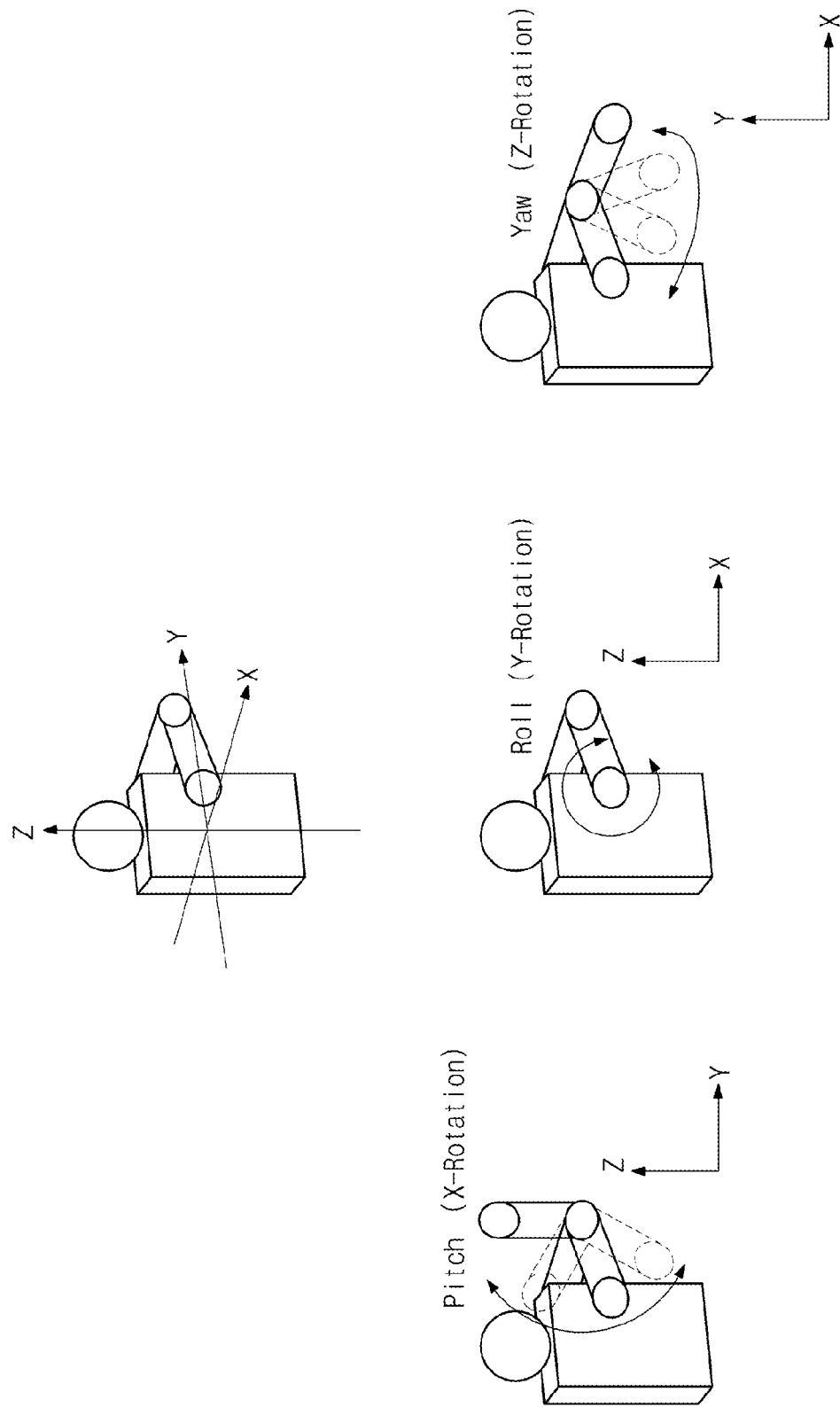
FIG. 2 is a diagram exemplarily illustrating 3-dimensional coordinates with respect to motion data according to an embodiment of the inventive concept.

FIG. 2 is a set of related diagrams illustrating one arbitrary definition of three dimensional motion coordinates with respect to a user wearing a wrist watch according to an embodiment of the inventive concept. For convenience of description, only three (3) axes of relative motion are assumed for motion of the wrist watch on the left arm of a figure show in FIG. 2. Hence, motion data will include data related to pitch, roll, and yaw, where pitch denotes X-axis rotation, roll denotes Y-axis rotation, and yaw denotes Z-axis rotation. Assuming that the z-axis is aligned with a sensed gravitational direction, pitch is motion on the Y-Z plain, roll is motion in the X-Z plain, and yaw is motion in the X-Y plain.

Figure 3:
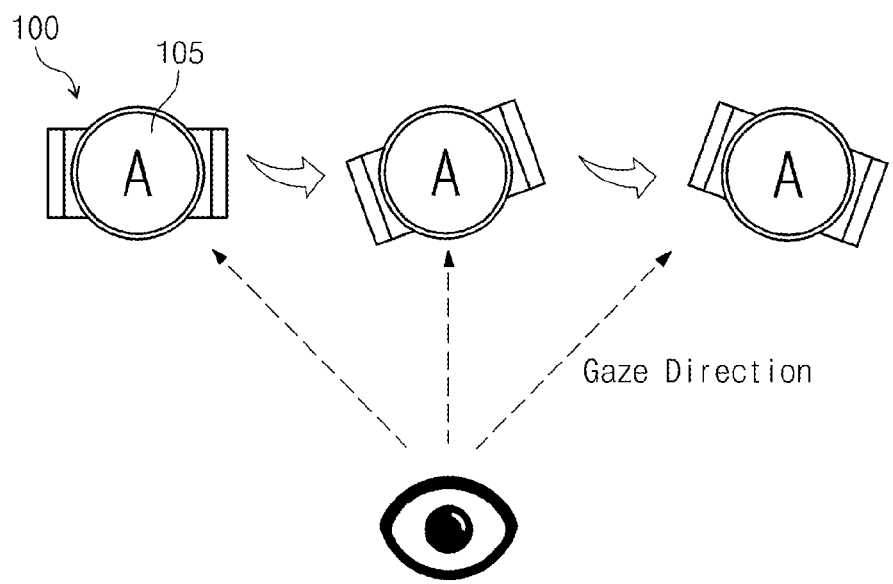
FIG. 3 is a diagram exemplarily illustrating a display orientation of a wearable watch according to an embodiment of the inventive concept.

FIG. 3 is a conceptual diagram illustrating a display orientation for the wearable watch 100 according to embodiments of the inventive concept. As shown in FIG. 3, for convenience of description, it assumes that the wearable watch 100 displays only the capital letter 'A'.

The wearable watch 100 generates motion data (e.g., pitch, role, and yaw data) in response to the sensed motion of the wearable watch 100. Thus, the wearable watch 100 displays the 'A' such that a user visualizes the shape of the displayed 'A' with a uniform shape regardless of the motion of the wearable watch 100. That is, a target shape of the displayed 'A' is altered with respect to the "gaze direction" of the user relative to the display 105.

Figure 4:
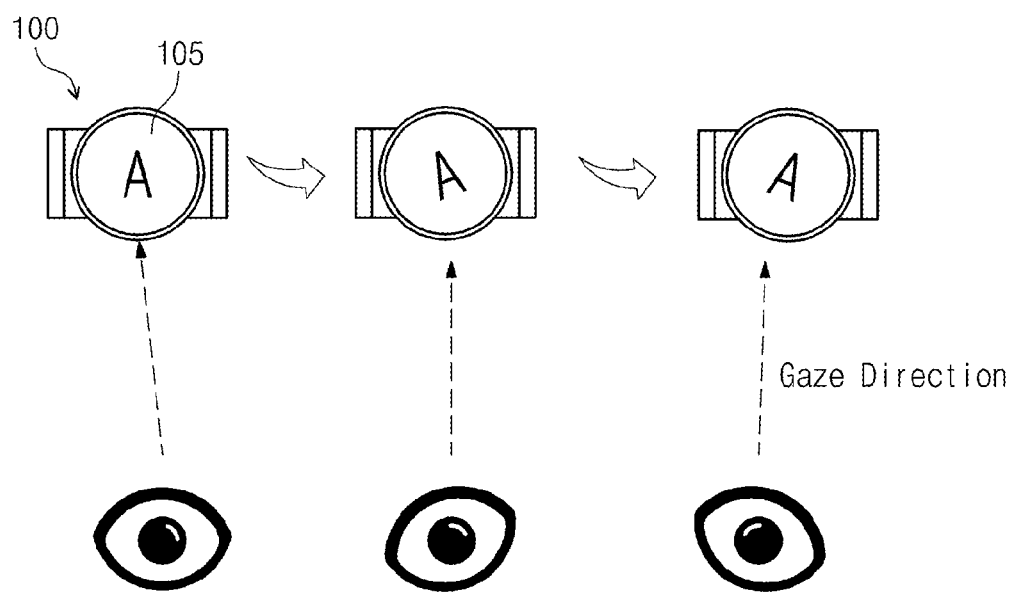
FIG. 4 is a diagram exemplarily illustrating a display orientation of a wearable watch according to another embodiment of the inventive concept.

FIG. 4 is another conceptual diagram illustrating a display orientation for the wearable watch 100 according to embodiments of the inventive concept. Here, in contrast to the example of FIG. 3, the relative location of the user is assumed to move while the display 105 of the wearable watch 100 remains stable. Nonetheless, the user is able to recognize the 'A' with a uniform shape regardless of the position of the user (or user's eye) and motion data (i.e., pitch, role, and yaw data) characterizing the disposition of the wearable watch 100. That is, a target shape according to a gaze direction of a user remains regular.

Figure 5:
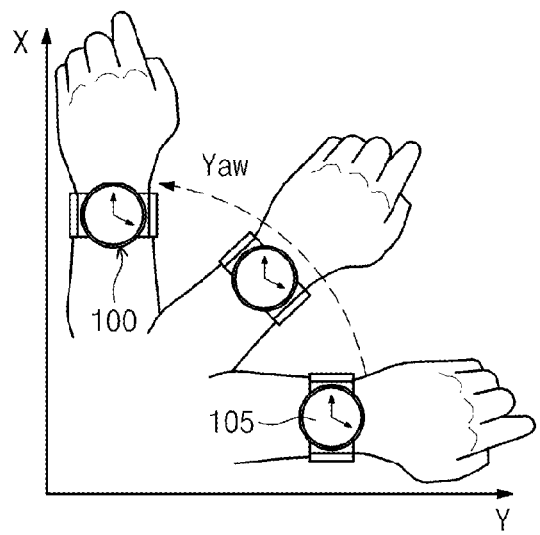
FIG. 5 is a diagram exemplarily illustrating a display orientation according to a yaw of a wearable watch according to an embodiment of the inventive concept.

FIG. 5 is still another conceptual diagram illustrating a display orientation as a function of yaw for the wearable watch 100 according to an embodiment of the inventive concept. Referring to FIG. 5, although a wearable watch 100 moves (i.e., yaws) through 90° of the X-Y plain, the visual shape of the clock face presented by the display 105 of the wearable watch remains uniform to the user.

That is, the display 105 inclines together because the wearable watch 100 and the user's arm move along the same route when the wearable watch 100 is fixed to the moving arm. Even though the position of the wearable watch 100 is changed in relation to the X, Y, and Z axes as attached to the moving arm, the user may visualize the display 105 in relation to the changing gaze direction, because the display 105 is continually updated to uniformly retain the target shape as a function of the user's gaze direction. This capability provides improved visibility of the wearable watch 100 in all orientation and greater ease of use.

Figure 6:
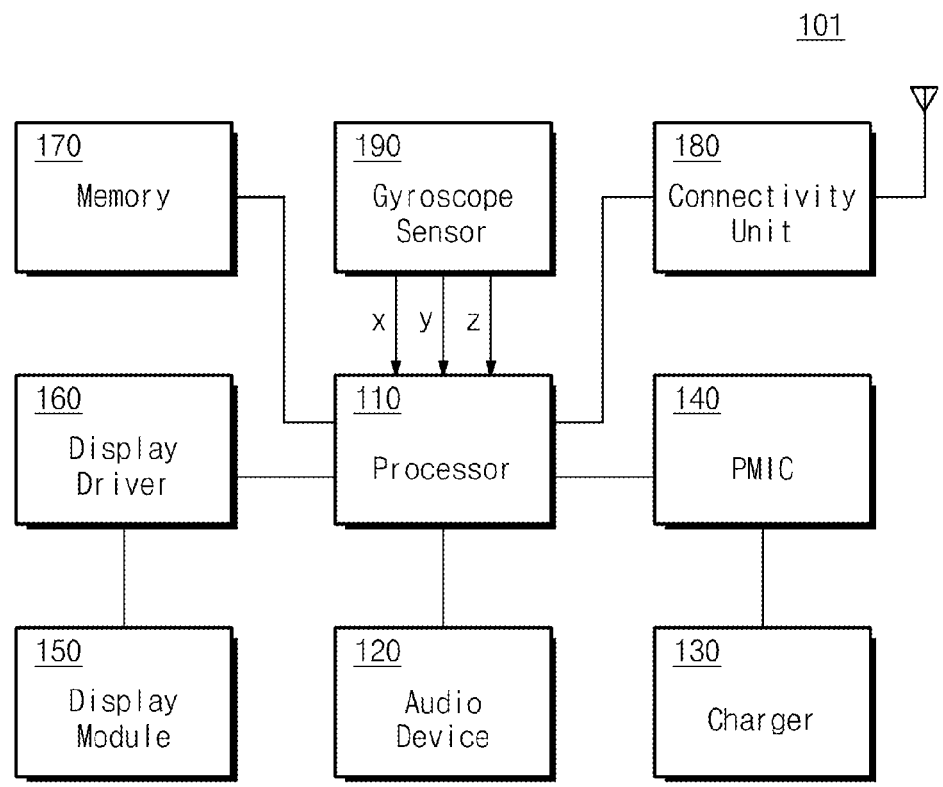
FIG. 6 is a diagram exemplarily illustrating a block diagram for constructing a watch body of the wearable watch according to an embodiment of the inventive concept.

FIG. 6 is a block diagram illustrating in one example the watch body 101 of the wearable watch 100 of FIG. 1 according to an embodiment of the inventive concept. Referring to FIG. 6, the watch body 101 comprises; a processor 110, an audio device 120, a charger 130, a power management integrated circuit (PMIC) 140, a display module 150, a display driver 160, a memory 170, a connectivity unit 180, and a gyroscope sensor 190.

The processor 110 may control an overall operation of the wearable watch 100. The audio device 120 may output audio data to an outside or recognize a voice. Although not shown, the audio device 120 may include a speaker and a microphone. The charger 130 may charge a battery with a cable charging method or a wireless charging method. The PMIC 140 may input power voltage and generate and manage operating voltages for driving the wearable watch 100. The display module 150 may output display data. The display driver 160 may control the display module 150. The memory device 170 may store data for driving the wearable watch 100 as well as data (including motion data) generated during operation of the wearable watch 100. The memory device 170 may include a volatile memory device and/or a non-volatile memory device. The connectivity unit 180 may be implemented to communicate with an external device in a wire or wireless manner.

The gyroscope sensor 190 may sense the motion of the wearable watch 100 and/or the motion of a user to generate corresponding motion data (e.g., pitch, roll, yaw: x, y, z) according to the sensed result.

Moreover, the wearable watch 100 may further include one or more image sensor(s) (e.g., a sensor disposed in the display 105) configured to detect and track the location of one or more images associated with the user. For example, an image sensor may be implemented to detect and track the location of the user's eyes, or an eye pupil.

Further, although not shown in FIG. 6, the wearable watch 100 may further include sensors usable in systems that support health, wellness services and/or related applications. For example, the sensors may include an Electrocardiogram (ECG) sensor, a Photoplethysmography (PPG) sensor, a Galvanic skin response (GSR) sensor, an electroencephalograph (EEG) sensor, and/or an electromyography (EMG) sensor.

The wearable watch 100 of FIG. 6 may be used to adjust a display orientation according to the motion data derived in relation to x, y, and z directions and as provided by the gyroscope sensor 190. As the result, the wearable watch 100 may maintain an optimal visual representation for images(s) on the display utilizing the gyroscope sensor 190, regardless of the position or motion of the user's arm—assuming that the wearable watch 100 is a smart watch attached to the user's wrist. Further, the wearable watch 100 may calculate pitch, roll and yaw information for the display with respect to sensed motion data.

Figure 7:
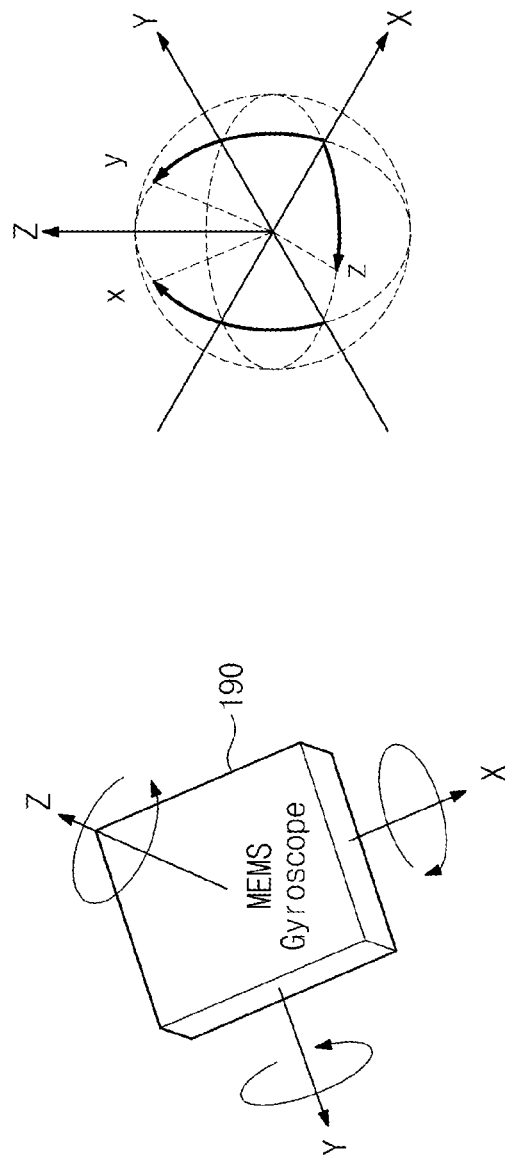
FIG. 7 is a diagram for describing a function of the gyroscope sensor shown in FIG. 6.

FIG. 7 is a conceptual diagram illustrating the functioning of the gyroscope sensor 190 of FIG. 6. Referring to FIG. 7, the gyroscope sensor 190 may be implemented as a MEMS installed in a wearable watch 100. The gyroscope sensor 190 outputs pitch data x which denotes a rotation angle of X-axis direction on a Y-Z plain, roll data y which denotes a rotation angle of Y-axis direction on an X-Z plain, and yaw data z which denotes a rotation angle of Z-axis direction on an X-Y plain.

Accordingly, the wearable watch 100 may sense a specific motion and selectively adjust a display image for the determined display orientation. For example, when the wearable watch 100 is rolled, the display orientation may be compensated using the yaw data z. That is, the display orientation may be compensated according to a change in the yaw data.

Figure 8:
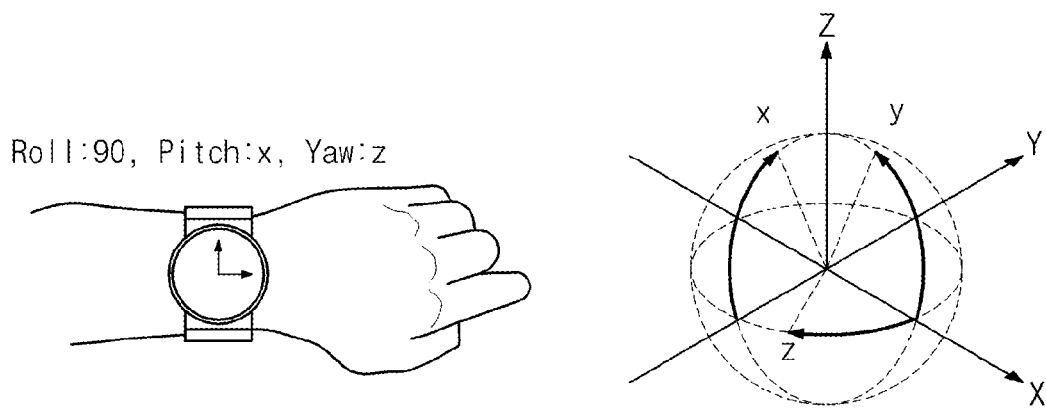
FIG. 8 is a diagram exemplarily illustrating motion data of the gyroscope sensor corresponding to a specific motion according to an embodiment of the inventive concept.

FIG. 8 is another conceptual diagram illustrating the generation of motion data by the gyroscope sensor 190 in certain embodiments of the inventive concept corresponding to a specific motion. Referring to FIG. 8, the motion data includes pitch data x of '0', roll data of '90', and yaw data of 'z'. In response to the specific motion where the roll data changes from 0 degree to 90 degrees or from 90 degrees to 0 degree, the display orientation may be compensated according to the change in the yaw data z corresponding to yawing of the wearable watch 100.

"Balance" of a displayed image may be accomplished with respect to the coordinate value as follows: the display rotates as much as an x value with respect to a change in pitch; the display is reversed up and down on the basis of 180 degrees with respect to a y value with respect to roll y; and the display is reset by a z value as 0 degree when the yaw z is reset. Accordingly, a value of z is set as a reference point z' and a parallel angle of the display is met with z' in $-10<x<10$ and $-90<y<90$. When the following operation occurs, the display rotates as much as $-(z-z')$ which is Z and the balance is maintained.

Figure 9:
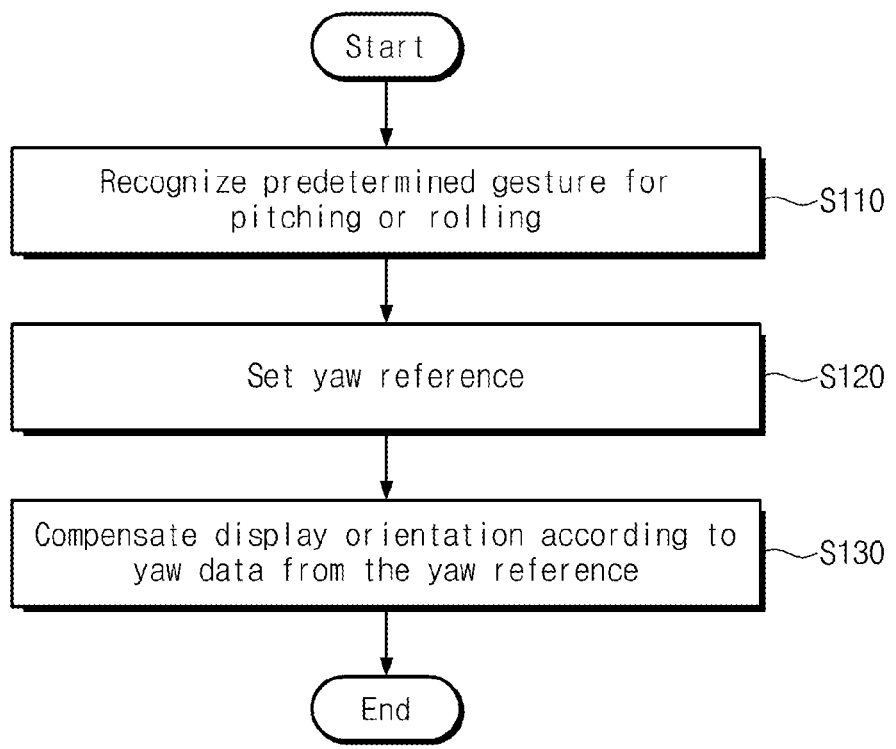
FIG. 9 is a flow chart illustrating a first embodiment of a display method of a wearable watch.

FIG. 9 is a flow chart summarizing in one example a display method that may be used in certain embodiments of the inventive concept, like the wearable watch 100 of FIG. 1.

Referring collectively to the foregoing illustrated embodiments, a display method comprises: the gyroscope sensor 190 recognizes a predetermined gesture including pitching or rolling with respect to the wearable watch 100 (S110); after the predetermined gesture is recognized, a reference value of yaw data z is set (S120); and the display orientation is compensated according to a change in the yaw data z corresponding to yawing from the reference value of the configured yaw data z (S130).

With the display method of the wearable watch 100 it is possible to compensate a display orientation according to a change in the yaw data z when the wearable watch 100 recognizes a specific gesture. However, according to certain variants on the with the foregoing display method, it is possible to compensate a display orientation according to whether a user pushes a specific button, without necessarily recognizing the specific gesture.

Figure 10:
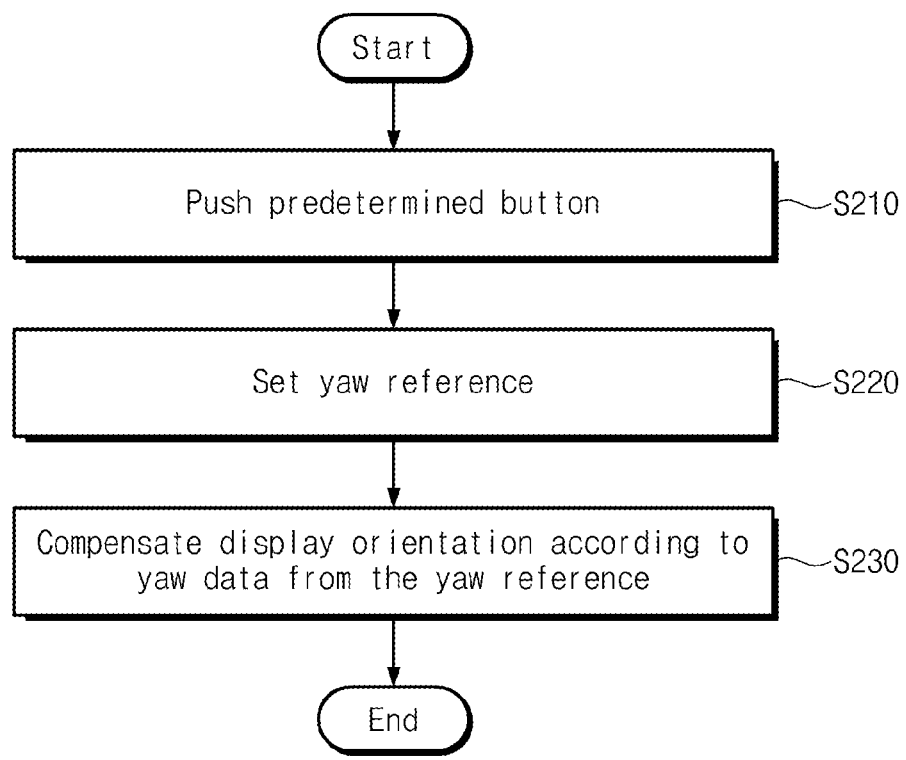
FIG. 10 is a flow chart illustrating a second embodiment of a display method of a wearable watch.

FIG. 10 is a flow chart summarizing in another example a display method that may be used in certain embodiments of the inventive concept, like the wearable watch 100 of FIG. 1.

Referring collectively to the foregoing illustrated embodiments, and in comparison with the display method of FIG. 9, the display method of FIG. 10 comprises a user pushing a specific button (or otherwise making a user-selection in accordance with one or more mechanical of graphically displayed selection means) (S210). That is, the "button" may be a hardware switch provided on the watch body 101 of the wearable watch 100, or an indication on a touch-sensitive portion of the display 105. Upon sensing the pushing of the button, the gyroscope sensor 190 sets a reference value of yaw data z (S220), and a display orientation is compensated according to an amount of change of the yaw data z from the reference value of the configured yaw data z (S230).

Thus, in the context of various display methods for operating the wearable watch 100, it is possible to recognize user selections and to compensate the display orientation according to same.

Figure 11:
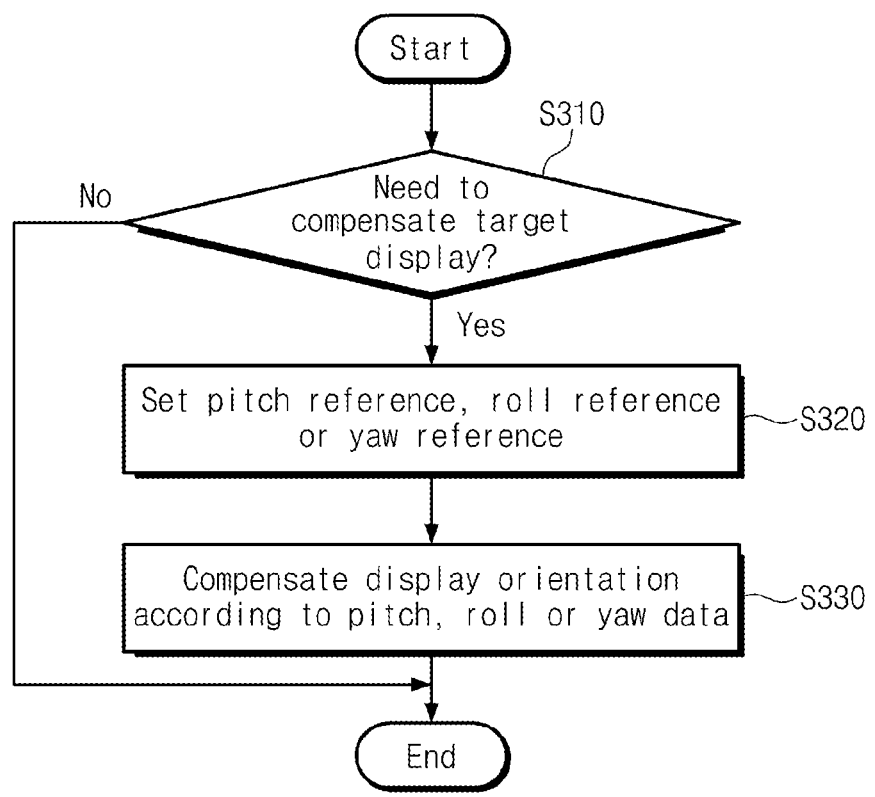
FIG. 11 is a flow chart illustrating a third embodiment of a display method of a wearable watch.

FIG. 11 is a flow chart summarizing in yet another example a display method that may be used in certain embodiments of the inventive concept, like the wearable watch 100 of FIG. 1.

Referring collectively to the foregoing illustrated embodiments, the display method of FIG. 11 comprises making a determination as to whether or not a display orientation needs to be compensated (S310). This determination may be made according to a user selection or detection of an internal reference condition by the wearable watch 100. For example, a particular user gesture (and corresponding motion of the wearable watch 100) may cause detection of the internal reference condition. Alternately, when implementing an augmented reality with respect to a target display, a user may determine whether the display orientation should be compensated. When the compensation of the display orientation is needed, the gyroscope sensor 190 sets a pitch reference value, a roll reference value, and a yaw reference value (S320). Then, the display orientation is compensated according to a change in at least one of pitch data, roll data, or yaw data (S330). In this manner, the wearable watch 100 may determine whether compensation of a display orientation is needed, and may selectively compensate the display orientation according to this determination.

Alternately or additionally, the wearable watch 100 may detect and interpret a gaze orientation, and a display orientation may be compensated according to the gaze orientation.

Figure 12:
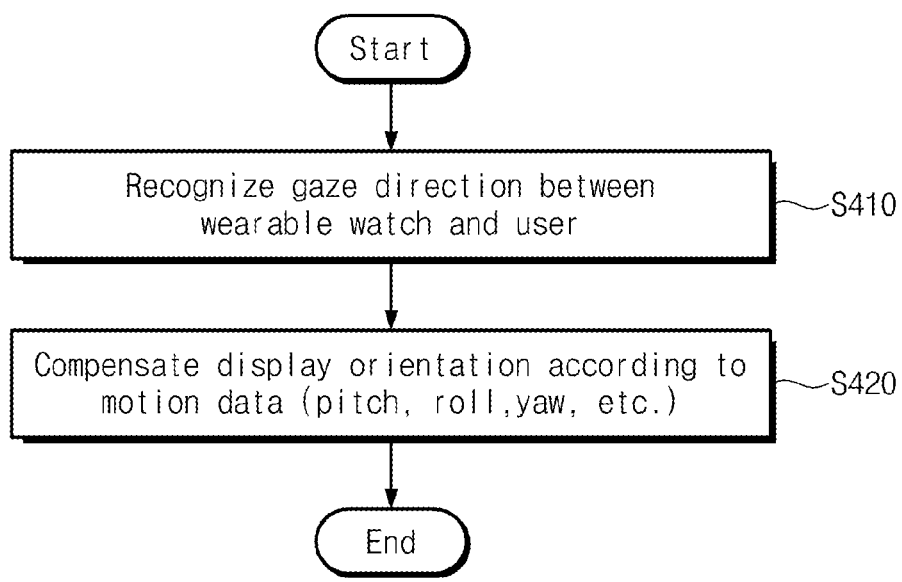
FIG. 12 is a flow chart illustrating a fourth embodiment of a display method of a wearable watch.

FIG. 12 is a flow chart summarizing in still another example a display method that may be used in certain embodiments of the inventive concept, like the wearable watch 100 of FIG. 1. Referring collectively to the foregoing illustrated embodiments, the display method of FIG. 12 comprises "recognizing" a gaze direction between the wearable watch 100 and user using at least one sensor (S140). The step of recognizing a particular gaze orientation may include sub-steps such as detecting a "user point", such as the location or disposition of an eye, a nose, lips, the disposition of a set of eyes or an eye pupil, the slope or angle of a particular facial feature, such as a pupil, etc., and then interpreting the detected user point in relation to the current location and/or orientation of the display 105 of the wearable watch 100. Thus, when a recognized gaze orientation falls out outside a predetermined range, the wearable watch 100 may determine to compensate the display orientation corresponding to the recognized gaze orientation (S420). In this manner, the wearable watch 100 may determine an optimal display orientation suitable for the recognized gaze direction.

Figure 13:
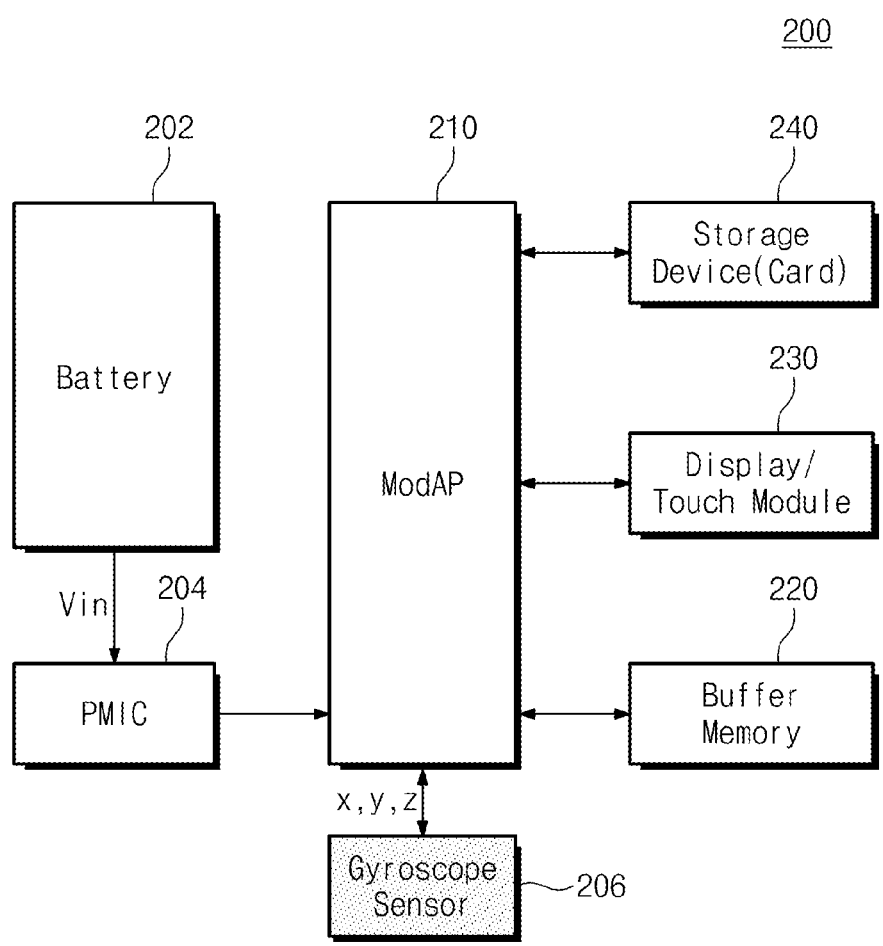
FIG. 13 is a block diagram illustrating a wearable watch according to another embodiment of the inventive concept.

In certain embodiments of the inventive concept a wearable watch may include a combination processor of the type combining an application processor and a communication chip. For example, FIG. 13 is a block diagram illustrating a wearable watch 200 according to another embodiment of the inventive concept. Referring to FIG. 13, the wearable watch 200 comprises; a battery 202, a PMIC 204, a gyroscope sensor 206, a combination processor (Modem and Application Processor (ModAP)) 210, a buffer memory 220, a display/touch module 230, and a storage device 240.

The battery 202 provides a power voltage Vin and the PMIC 204 generates operating voltages in response to the power voltage Vin. The combination processor 210 may be implemented to control an overall operation of the wearable watch 200 and communicate with the external device in a wire or wireless manner. The buffer memory 220 may be implemented to temporarily store data for processing operation of the wearable watch 200. The display/touch module 230 may be implemented to display data from the combination processor 21 or input data from a touch panel. The storage device 240 may be implemented to store data of a user. The storage device 240 may be an embedded multimedia card (eMMC) device, a solid state drive (SSD) device, and a universal flash storage (UFS) device.

Figure 14:
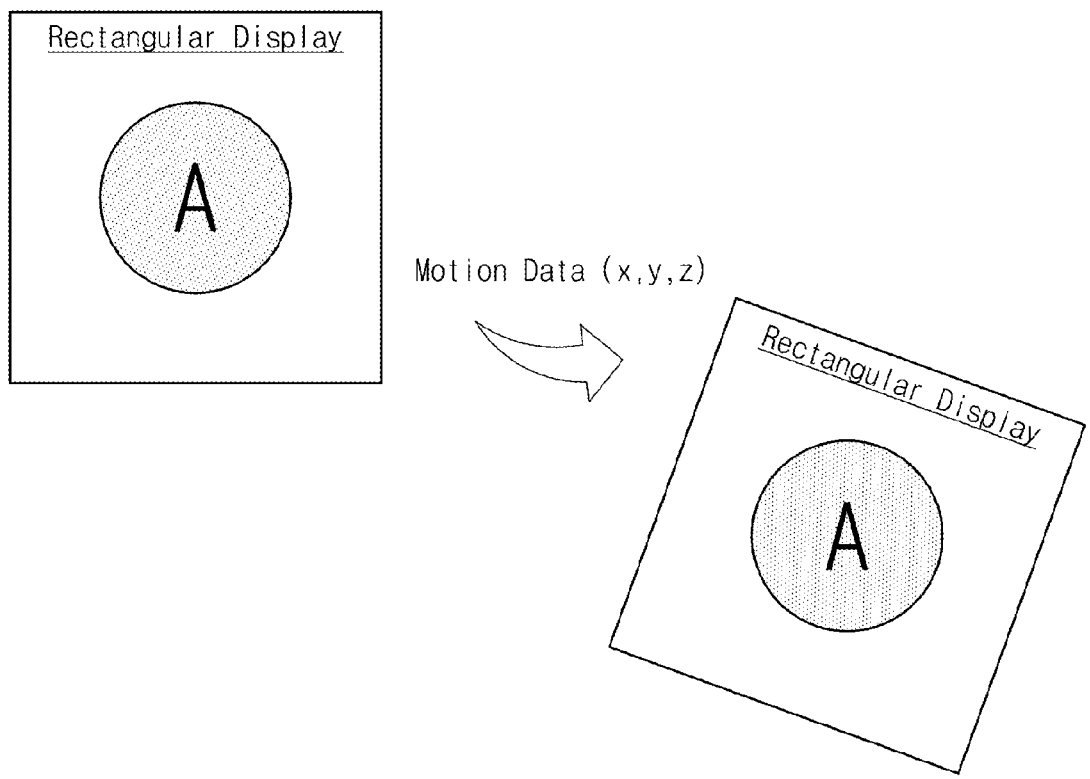
FIG. 14 is a block diagram illustrating a rectangular display according to an embodiment of the inventive concept.

As previously noted, the watch body 101 and constituent display 105 may have various sizes, relative sizes, shapes and presentations. FIG. 14 assumes a rectangular display that currently displays a circular image including the letter 'A'. Here, the displayed image may be said to have an overall circular target shape partially filling the visual field provided by the rectangular display. In response to detected motion, the display orientation of the circular target shape may be changed (or compensated) according to motion data (x, y, and z) determined in relation to a recognized gaze orientation, for example.

The foregoing features, methods, and resulting data need not be limited to only the compensation of a display orientation for an image displayed by the wearable watch itself. Further, the generation of motion data necessary to this process need not originate with the wearable watch. Rather, the wearable watch may be used to sense motion (e.g., user motion and/or wearable watch motion), determine a display orientation according to the sensed result, and then wirelessly pass corresponding motion data (or data derived from the motion data) to some other device. Alternately, motion data may be externally generated and provided to the wearable watch.

For example, FIG. 15 is a conceptual diagram illustrating one approach to determining a display orientation according to certain embodiments of the inventive concept. Here, a mobile device 20 (e.g., a smart phone) may be used to wirelessly communicate motion data to a wearable watch 10. The mobile device 20 may sense motion (i.e., user motion and/or wearable watch motion), and then communicate the resulting motion data to the wearable watch 10. The wearable watch 10 may then determine an optimal display orientation from a recognized gaze direction for the user based on the externally provided motion data and/or internally sensed motion data.

At this point, it should be noted that the foregoing may be applied to any portable (e.g., a tablet or smart phone) device having a display. The wearable watch described above in various embodiments is merely one form of "wearable appliance" that may configured according to embodiments of the inventive concept.

While the inventive concept has been described with reference to exemplary embodiments, it will be apparent to those skilled in the art that various changes and modifications may be made without departing from the scope of the following claims.

What is claimed is:

1. A method of operating a wearable watch worn by a user and including a display, the method comprising:
   recognizing a predetermined gesture including pitching or rolling corresponding to movement of the wearable watch relative to the user;
   setting a yaw reference value upon recognizing of the predetermined gesture; and
   compensating an angle of a target shape for an image displayed on the display according to a change in yaw data corresponding to a difference between a yawing angle of the display and a yawing angle of an eye of the user based on the yaw reference value to visually maintain a uniform target shape for the image according to a gaze direction between the user and the display throughout the movement of the wearable watch in the recognized predetermined gesture.

2. The method of claim 1,
   wherein the display is a circular display panel, or a rectangular display panel.

3. The method of claim 1, further comprising:
   determining whether or not the angle of the target shape should be compensated in relation to the gaze direction.

4. The method of claim 3, wherein the determining of whether or not the angle of the target shape should be compensated in relation to the gaze direction comprises:
   determining whether the gaze direction falls outside a specified range.

5. The method of claim 1, further comprising:
   recognizing the gaze direction in relation to a point on a user and the display.

6. The method of claim 4, further comprising:
   setting a pitch reference value or a roll reference value upon recognizing of the predetermined gesture.

7. The method of claim 6, wherein the compensating of the angle of the target shape for the image comprises:
   compensating a display orientation according to pitch data corresponding to pitching from the pitch reference value, or
   compensating the display orientation according to roll data corresponding to rolling from the roll reference value.

8. The method of claim 1, wherein the recognizing of the predetermined gesture comprises:
   receiving pitch data and roll data from a gyroscope sensor, and
   recognizing the predetermined gesture using the pitch data and the roll data.

9. The method of claim 1, wherein the compensating of the angle of the target shape for the image comprises:
   compensating the angle of the target shape such that the target shape maintains a uniform appearance to the user regardless of yawing within a specified range.

10. A method of operating a wearable watch worn by a user and including a display, the method comprising:
    in response to the user pushing a button on the wearable watch, setting a yaw reference value; and
    compensating an angle of a target shape for an image displayed on the display according to a change in yaw data corresponding to a difference between a yawing angle of the display and a yawing angle of an eye of the user based on the yaw reference value to visually maintain a uniform target shape for the image according to a gaze direction between the user and the display throughout movement of the wearable watch relative to the user.

11. The method of claim 10,
    wherein the button is one of a hardware switch provided on a watch body of the wearable watch, and a button graphically displayed on the display.

12. The method of claim 10, wherein the recognizing of the gaze direction between the user and the display comprises:
    detecting a point on the user; and
    interpreting the point on the user in relation to a current location of the display to recognize the gaze direction.

13. The method of claim 12,
    wherein the point on the user is an eye pupil of the user, and
    wherein the recognizing of the gaze direction between the user and the display further comprises identifying a relative slope of the eye pupil of the user.

14. A method of operating a wearable watch worn by a user and including a display, the method comprising:
    determining motion data based on movement of the wearable watch relative to the user;
    recognizing a gaze direction between the user and the display; and
    compensating an angle of a target shape for an image displayed on the display according to the motion data corresponding to a difference between a yawing angle of the display and a yawing angle of an eye of the user to visually maintain a uniform target shape for the image according the gaze direction throughout the movement of the wearable watch and while a different shape visually changes from the movement of the wearable watch in the recognized predetermined gesture.

15. The method of claim 14, wherein the motion data includes pitch data, roll data, and yaw data generated by at least one sensor in the wearable watch.

16. The method of claim 14, wherein the recognizing of the gaze direction between the user and the display comprises:
    detecting a point on the user; and
    interpreting the point on the user in relation to a current location of the display to recognize the gaze direction.

17. The method of claim 15, wherein the determining of the motion data comprises:
    generating the pitch data, roll data, and yaw data in a Micro-Electro-Mechanical System (MEMS) gyroscope sensor disposed internal to the wearable watch.

18. The method of claim 17, wherein the wearable watch comprises:
    a watch body and a watch band connected to the watch body to attach the wearable watch to the user's wrist, and
    at least one of the watch body and watch hand comprises the MEMS gyroscope sensor.

19. The method of claim 15, wherein the determining of the motion data comprises:
    generating the pitch data, roll data, and yaw data in a Micro-Electro-Mechanical System (MEMS) gyroscope sensor disposed external to the wearable watch in a portable device carried by the user; and wirelessly communicating the motion data from the portable device to the wearable watch.

20. The method of claim 14, further comprising:
determining an absolute direction using a gravitational acceleration sensor; and
using the absolute direction to determine the gaze direction.

\* \* \* \* \*